United States Patent
Gosney et al.

(10) Patent No.: US 9,765,617 B2
(45) Date of Patent: Sep. 19, 2017

(54) SURFACE FLUID EXTRACTION AND SEPARATOR SYSTEM

(71) Applicant: Halliburton Energy Services, Inc., Houston, TX (US)

(72) Inventors: Jon Troy Gosney, Bellville, TX (US); Mathew Dennis Rowe, Lafayette, LA (US); Michael Linley Fripp, Carrollton, TX (US); Stephen Michael Greci, Little Elm, TX (US); John Charles Gano, Carrollton, TX (US)

(73) Assignee: Halliburton Energy Services, Inc., Houston, TX (US)

(*) Notice: Subject to any disclaimer, the term of this patent is extended or adjusted under 35 U.S.C. 154(b) by 21 days.

(21) Appl. No.: 14/436,158

(22) PCT Filed: May 9, 2014

(86) PCT No.: PCT/US2014/037541
§ 371 (c)(1),
(2) Date: Apr. 16, 2015

(87) PCT Pub. No.: WO2015/171160
PCT Pub. Date: Nov. 12, 2015

(65) Prior Publication Data
US 2016/0273355 A1    Sep. 22, 2016

(51) Int. Cl.
*B01D 53/24*     (2006.01)
*E21B 49/08*     (2006.01)
(Continued)

(52) U.S. Cl.
CPC ........ *E21B 49/086* (2013.01); *B01D 19/0078* (2013.01); *B01D 19/0094* (2013.01);
(Continued)

(58) Field of Classification Search
None
See application file for complete search history.

(56) References Cited

U.S. PATENT DOCUMENTS

| 4,635,735 A |   | 1/1987 | Crownover |
| 5,827,357 A | * | 10/1998 | Farion .................... E21B 21/063 |
|  |  |  | 210/512.2 |

(Continued)

FOREIGN PATENT DOCUMENTS

WO    2015171160 A1    11/2015

OTHER PUBLICATIONS

International Search Report and Written Opinion for PCT/US2014/037541 dated Feb. 9, 2015.

*Primary Examiner* — Amber R Orlando
*Assistant Examiner* — Phillip Shao
(74) *Attorney, Agent, or Firm* — McDermott Will & Emery LLP (57) ABSTRACT

A disclosed example embodiment of a fluid extraction system includes a fluid circuit fluidly coupled to a source of a fluid and configured to receive a fluid sample from the source, and a fluid separator arranged in the fluid circuit and configured to receive the fluid sample. The fluid separator includes a body that defines at least one fluid inlet, a flow chamber defined within the body, and is configured to receive and spin the fluid sample from the at least one fluid inlet. The fluid sample spirals inward and forms a vortex, and gases entrained within the fluid sample separate and migrate toward a center of the vortex. An outlet defined in the flow chamber provides a gas outlet that entrains and removes the gases and a liquid outlet receives and removes a remaining portion of the fluid sample.

25 Claims, 4 Drawing Sheets (51) Int. Cl.
 *E21B 21/06* (2006.01)
 *E21B 21/07* (2006.01)
 *B01D 19/00* (2006.01)
 *E21B 47/18* (2012.01)

(52) U.S. Cl.
 CPC ............ *E21B 21/06* (2013.01); *E21B 21/067* (2013.01); *E21B 21/07* (2013.01); *E21B 49/08* (2013.01); *E21B 47/18* (2013.01); *E21B 2049/085* (2013.01)

(56) References Cited

U.S. PATENT DOCUMENTS

| | | |
|---|---|---|
| 6,402,799 B1 | 6/2002 | Kokubo et al. |
| 8,025,713 B2 * | 9/2011 | Dou ................... B01D 19/0057 55/459.3 |
| 8,235,128 B2 | 8/2012 | Dykstra et al. |
| 8,261,839 B2 | 9/2012 | Fripp et al. |
| 8,276,669 B2 | 10/2012 | Dykstra et al. |
| 8,291,976 B2 | 10/2012 | Schultz et al. |
| 8,327,885 B2 | 12/2012 | Dykstra et al. |
| 8,474,534 B1 | 7/2013 | Fripp et al. |
| 8,479,831 B2 | 7/2013 | Dykstra et al. |
| 2006/0075801 A1 | 4/2006 | Evrard et al. |
| 2011/0094736 A1 | 4/2011 | Evrard |
| 2012/0255351 A1 | 10/2012 | Dykstra |
| 2012/0279593 A1 | 11/2012 | Fripp et al. |
| 2013/0275047 A1 | 10/2013 | Selman et al. |
| 2013/0319104 A1 | 12/2013 | Schexnaider et al. |

\* cited by examiner

SURFACE FLUID EXTRACTION AND SEPARATOR SYSTEM

This application is a National Stage entry of and claims priority to International Application No. PCT/US2014/037541, filed on May 9, 2014.

BACKGROUND

The present disclosure is related to wellbore operations and, more particularly, to a fluid extraction and separation system.

In the oil and gas industry, many different types of fluids are circulated into a wellbore and subsequently returned to the surface. Such fluids, often referred to as "fluid returns," can include, but are not limited to, drilling fluid, completion fluids, fracturing fluids, stimulations fluids, spotting fluids, wellbore treatment fluids, etc. Fluid returns are often analyzed by well operators in order to determine various wellbore parameters.

For instance, while a well is being drilled, various measurements can be obtained from fluid returns from a drilling fluid. For example, these measurements provide a running log or record of the drilling operation, which permits a well operator to analyze the earth formations that are progressively being penetrated by the drill bit. The running log generated from the measurements can be particularly important because it can enable the well operator to ascertain the presence of oil, gas, and/or other formation fluids in the formations being penetrated. For instance, it is possible by comparing the ratios of methane to each of several other hydrocarbon gases present in the fluid return, such as ethane, propane, butane and pentane, to estimate whether a well will be productive and, if so, whether the well will produce oil, gas or water. Beyond this, the running log may prove advantageous in providing ratios for total gas content to oil content, water content, location relative to formation, depositional environment, and further aid in drilling optimization.

In order to measure the type and amount of a fluid found in the particular formation being drilled, the drilling fluid returning to the surface can be continuously or discretely sampled and introduced into a fluid separator that extracts gases entrained in the drilling fluid. The extracted gases can then be conveyed to a gas analyzer to determine the chemical composition. In some cases, the separated liquids may also be analyzed for chemical composition.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to wellbore operations and, more particularly, to a fluid extraction and separation system.

The various embodiments of the fluid extraction system disclosed herein may be used in the extraction and analysis of gases entrained in fluid returns or sample fluids at a rig site, but may equally be applicable to the extraction and analysis of gases entrained in sample fluids obtained subsurface. The sample fluid may be associated with any operation undertaken at the rig site including, but not limited to, drilling, circulating, completing, cementing, stimulating and/or fracturing. Advantageously, the presently described fluid separators that may be used in the fluid extraction system are configured to extract fluids from the fluid sample based on at least one property of the fluid. One property of the fluid may be its density, and the presently described fluid separators may extract fluids from the fluid sample based on a density differential between the various fluidic components. Another property of the fluid may be its viscosity, and the presently described fluid separators may also extract fluids from the fluid sample based on a viscosity differential between the various fluidic components.

The presently described fluid separators also exhibit a compact design configured to induce higher fluid velocities that enhance fluid separation based on density and/or viscosity differentials. The fluid extraction system may further include one or more energy input devices configured to enhance gas separation. In some embodiments, for instance, a thermal energy device may be used to maintain the fluid sample at a predetermined fluid extraction temperature. In other embodiments, or in addition thereto, one or more sonicators may be used to induce cavitation in the sample fluid, which further enhances the gas separation process.

Figure 1:
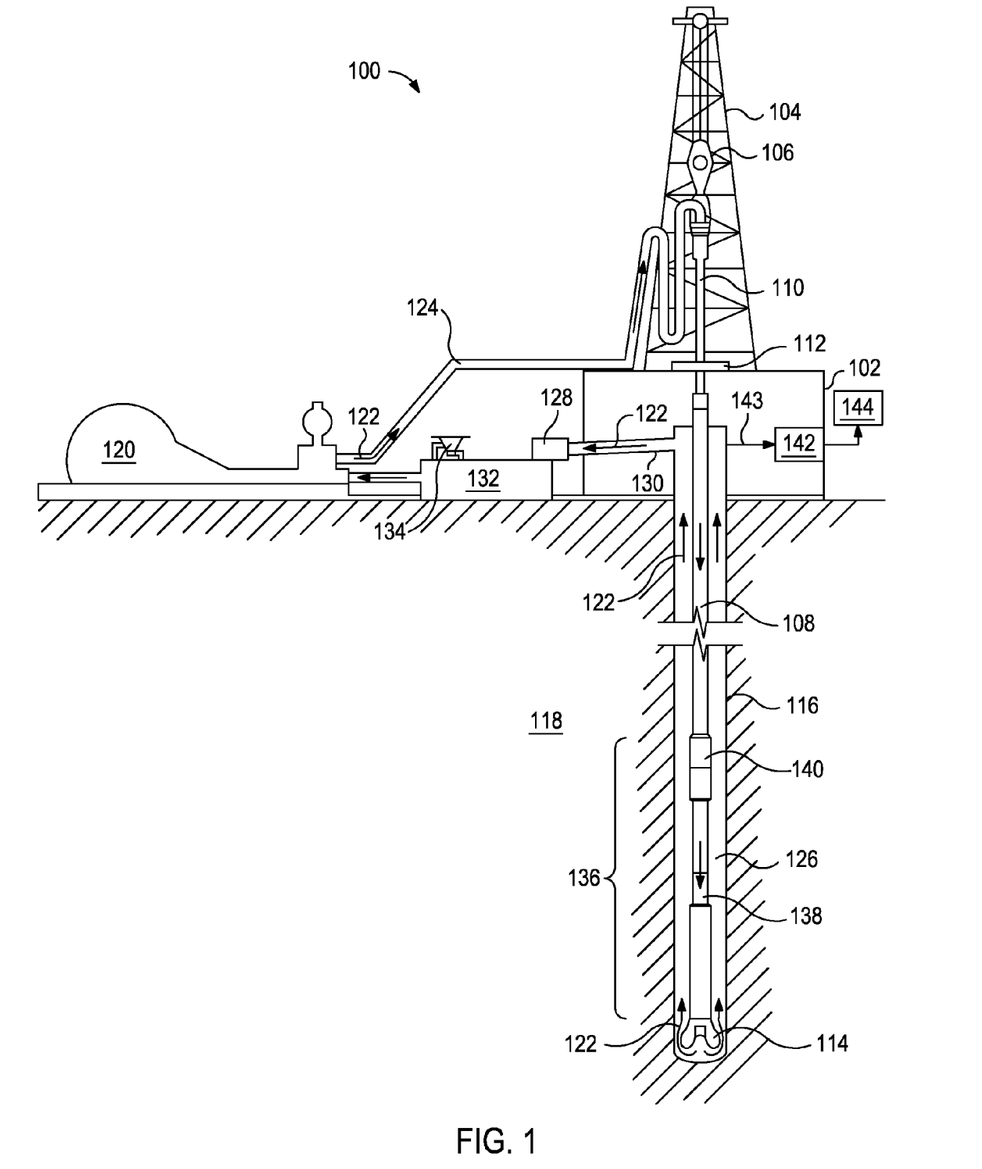
FIG. 1 illustrates an exemplary drilling system that may employ the principles of the present disclosure.

Referring to FIG. 1, illustrated is an exemplary embodiment of a drilling system 100 that may employ the principles of the present disclosure. As illustrated, the drilling system 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure. The principles may also be applicable to other forms of drilling including, but not limited to, dual gradient drilling, managed pressure drilling, and underbalanced drilling.

A pump 120 (e.g., a mud pump) circulates a fluid 122 through a feed pipe 124 and into the interior of the drill string 108. In some embodiments, the fluid 122 may be a drilling fluid used in the presently described drilling system 100. However, it should be noted that the principles of the present disclosure are equally applicable to any type of fluid return or sampled fluid derived from a wellbore. Accordingly, usage of "the fluid 122" is meant to encompass, without limitation, any other type of fluid that may be circulated through a wellbore, produced at the surface at or near the platform 102, or sampled downhole and subsequently provided to the fluid extraction system 142. For instance, "the fluid 122" may equally apply to reservoir fluids, gases, oils, water, and any other fluid that may be produced from a wellbore. Moreover, the drilling system 100 may equally be replaced or otherwise equated with any wellbore fluid extraction system, such as a wellhead installation used to produce fluids to the surface.

In the drilling system 100, the fluid 122 may be conveyed via the drill string 108 to the drill bit 114 and out at least one orifice in the drill bit 114. The fluid 122 is then circulated back to the surface via an annulus 126 defined between the drill string 108 and the walls of the wellbore 116. At the surface, the recirculated or spent fluid 122 exits the annulus 126 and may be conveyed to one or more fluid processing unit(s) 128 via a fluid return line 130. After passing through the fluid processing unit(s) 128, a "cleaned" fluid 122 is deposited into a nearby retention pit 132 (i.e., a mud pit). One or more chemicals, fluids, or additives may be added to the fluid 122 via a mixing hopper 134 communicably coupled to or otherwise in fluid communication with the retention pit 132.

The drilling system 100 may further include a bottom hole assembly (BHA) 136 arranged in the drill string 108 at or near the drill bit 114. The BHA 136 may include any of a number of sensor modules 138 (one shown) which may include formation evaluation sensors and directional sensors, such as measuring-while-drilling and/or logging-while-drilling tools. These sensors are well known in the art and are not described further. The BHA 136 may also contain a fluid pulser system 140 that induces pressure fluctuations in the fluid flow. Data from the downhole sensor modules 138 are encoded and transmitted to the surface via the pulser system 140 whose pressure fluctuations, or "pulses," propagate to the surface through the column of fluid flow in the drill string 108. At the surface the pulses are detected by one or more surface sensors (not shown), such as a pressure transducer, a flow transducer, or a combination of a pressure transducer and a flow transducer.

During the drilling operation, a discrete or continuous sample of the fluid 122 returning to the surface (i.e., the fluid returns) may be obtained and conveyed to a fluid extraction system 142 arranged at or near the drilling platform 102. The sample may be conveyed to the fluid extraction system 142 via a suction tube 143 fluidly coupled to a source of the fluid 122 returning to the surface. In some embodiments, for instance, the suction tube 143 may be fluidly coupled to the fluid return line 130. In other embodiments, however, the suction tube 143 may be directly coupled to the annulus 126 such that a sample of the fluid 122 may be obtained directly from the well at or near the surface of the well. For example, the fluid extraction system 142 may alternatively be arranged within the fluid return line 130 prior to the fluid processing unit(s) 128. In such an embodiment, the suction tube 143 may be omitted. In yet other embodiments, the suction tube 143 may be coupled the possum belly at the mud tanks or a header box associated with the fluid processing unit(s) 128, without departing from the scope of the disclosure.

As described in greater detail below, the fluid extraction system 142 may include a fluid separator configured to extract gases from the sample of the fluid 122 and analyze the chemical composition of the extracted gases. The fluid separator may be configured to use the flow energy of the incoming sample fluid to generate increased fluid velocities that help enhance the separation process. In operation, the fluid separator may be configured to extract gases from the sample fluid based on a density and/or viscosity differential between the various fluidic components of the sample fluid. Once the gas is extracted from the sample fluid, the chemical composition of the fluid may then be determined with an associated analytical device or gas logging unit arranged at or near the drilling platform 102. In some embodiments, however, the separated fluids may be stored in a container and taken off site and subsequently analyzed under laboratory conditions, without departing from the scope of the disclosure.

Once the chemical composition of the fluid is determined, the data may be transmitted (either wired or wirelessly) to one or more peripheral devices 144, either on or off site, to any interested party for consideration, for example, at a control hub remote from the location of the well from which the fluid was gathered. As will be appreciated, knowledge of the chemical composition of gases extracted from the fluid 122 can be used by an analyst, mud logger, geochemist, geologist, petrophysicist, or other well operators having knowledge of formational fluid analysis in identifying hydrocarbon-bearing zones. In addition, in applications where the fluid 122 is drilling fluid, it could be used to change the drilling parameters or drilling fluid composition. As will be appreciated, such knowledge of the chemical composition of gases extracted from the fluid 122 can equally be beneficial for well operators in drilling of other types of wells such as, but not limited to, helium, nitrogen, or geothermal wells.

The peripheral devices 144 may include, but are not limited to, a monitor (e.g., displays, GUIs, etc.), a printer, an alarm, additional storage memory, etc. In some embodiments, the monitor or the printer may be configured to provide the well operator with a graphical output corresponding to a particular parameter of the extracted gas. In other embodiments, the alarm (either audible or visual) may be configured to alert the well operator that a particular gas, a concentration of a gas, or a ratio of gases, has been detected, such as high levels of $CO_2$ or $H_2S$. If the levels or ratios of such gases exceed a predetermined limit, the well operator may desire to cease the particular wellbore operation (e.g., drilling, completing, fracking, circulating, etc.) or otherwise alter one or more operational parameters.

Figure 2:
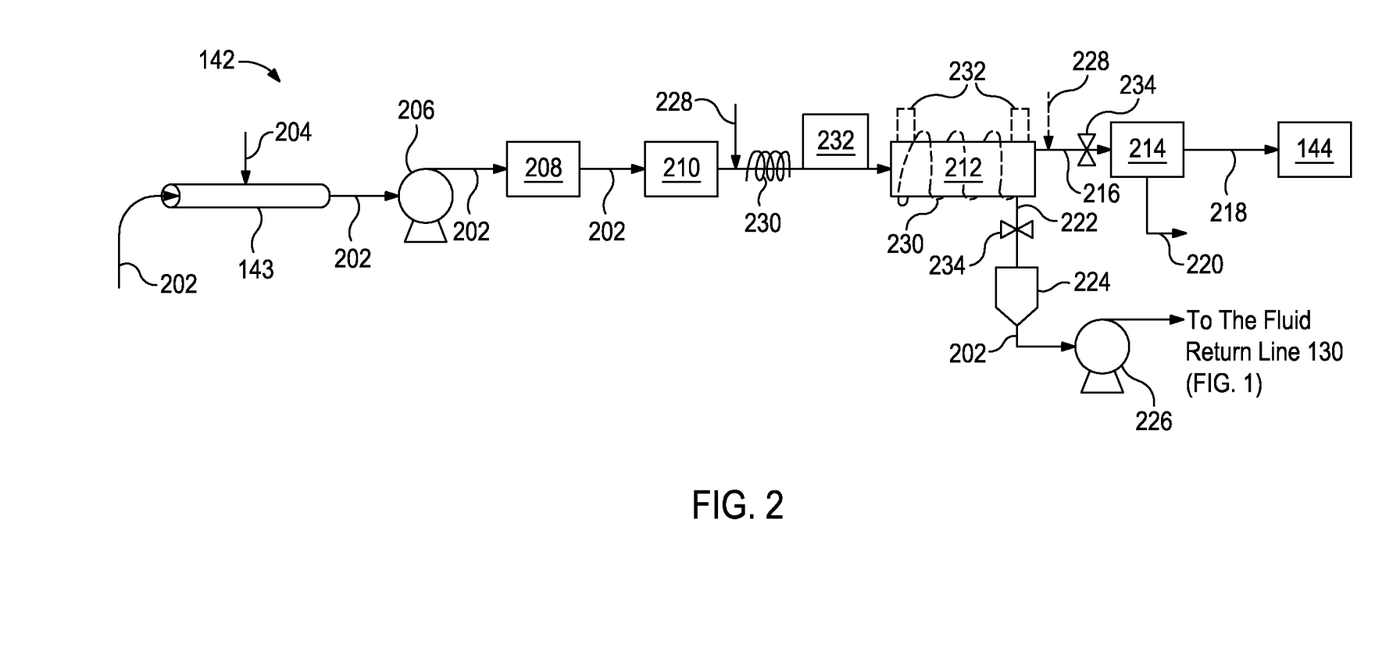
FIG. 2 illustrates a schematic diagram of an exemplary fluid extraction system, according to one or more embodiments of the present disclosure.

Referring now to FIG. 2, with continued reference to FIG. 1, illustrated is a schematic diagram of an exemplary embodiment of a fluid extraction system 142, according to one or more embodiments of the present disclosure. The fluid extraction system 142 (hereafter "the system 142") may be configured to receive a fluid sample 202 extracted from a source of a wellbore fluid, as generally described above. In some embodiments, for instance, the fluid sample 202 may be a sample of the fluid 122 (FIG. 1) as it is recirculated back to the surface. In other embodiments, however, the fluid sample 202 may be any type of wellbore fluid including, but not limited to, a completion fluid, a fracking fluid, a wellbore treatment fluid, a reservoir fluid, a gas, oil, water, and any combination thereof. In yet other embodiments, the fluid sample 202 may be derived from production fluids being drawn out of the wellbore, without departing from the scope of the disclosure.

The fluid sample 202 may be sampled continuously or discretely via the suction tube 143, which may introduce the fluid sample 202 into a fluid circuit defined by the system 142. As indicated above, the suction tube 143 may be fluidly coupled to a source of the fluid sample 202, such as the fluid return line 130 (FIG. 1), the annulus 126 (FIG. 1), or any other source of the fluid returning to the surface. In some embodiments, as also mentioned above, the fluid sample 202 may be a sample obtained downhole and accessible by the suction tube 143 such that it may be introduced into the fluid circuit.

In some embodiments, the suction tube 143 may be configured to clear and otherwise help remove blockages that may prevent or impede the fluid sample 202 from being introduced to the system 142. In one embodiment, for instance, a compressed gas 204 may be injected into the suction tube 143 in order to clear any blockages or buildups that may have grown within the suction tube 143 or further upstream in the fluid return line 130 (FIG. 1) or the annulus 126 (FIG. 1). In another embodiment, the suction tube 143 may be vibrated and otherwise shaken at a high frequency to similarly break loose any blockages or obstacles that may have formed and that might impede the fluid sample 202 from being introduced to the system 142.

In some embodiments, the system 142 may include a pump 206 that receives the fluid sample 202 from the suction tube 143. The pump 206 may be any device or mechanism configured to pressurize and otherwise maintain a predetermined pressure on the fluid sample 202 as it circulates through the fluid circuit of the system 142. In some embodiments, the pump 206 may be configured to maintain a constant superficial velocity, volumetric flow rate, or mass flow rate of the fluid sample 202 within the fluid circuit. The pump 206 may be a positive displacement pump, such as a progressive cavity pump or a peristaltic pump. In other embodiments, however, the pump 206 may be or may otherwise be replaced with a fluid column configured to maintain a pressure head on the fluid sample 202 as it circulates through the fluid circuit. In yet other embodiments, the pump 206 may be configured to inject a pressurized fluid, such as nitrogen or air, into the fluid sample 202 in order to pressurize and otherwise push the fluid sample 202 through the fluid circuit of the system 142.

The system 142 may further include a pulse dampener 208 and a flow meter (or mass meter) 210 arranged within the fluid circuit. The pulse dampener 208 may be configured to eliminate pulsating fluid flow through the fluid circuit that may be generated by the pump 206. The flow meter 210 may be any device configured to measure the mass flow rate of the fluid sample 202 as it circulates through the fluid circuit, and may further be configured to measure and report the density of the fluid sample 202. In at least one embodiment, for example, the flow meter 210 may be a coriolis flow meter, which is a mass flow meter.

The fluid sample 202 may then be conveyed to and otherwise received by a fluid separator 212. The fluid separator 212 may be configured to extract fluids from the fluid sample 202. As described in greater detail below, the fluid separator 212 may be configured to separate or extract gases from the fluid sample 202 based on at least one of density or viscosity of the various components of the fluid sample 202. The extracted fluids may then be directed out of the fluid separator 212 and to a unit 214 via a fluid flow line 216. As illustrated, the fluid flow line 216 fluidly couples the fluid separator 212 and the unit 214.

In some embodiments, the unit 214 may be a gas logging unit configured to analyze gases extracted from the fluid sample 202 for chemical composition. Exemplary gas logging units include, but are not limited to, total hydrocarbon analyzers, gas chromatographs, Fourier transform infrared (FTIR) spectrometers, infrared spectrometers, mass spectrometers, mass spectrometry/mass spectrometry (MS/MS) instruments, gas chromatographic-selected-ion recording devices, gas chromatography-mass spectrometry (GC-MS) instruments, Raman spectrometers, solid state detectors, liquid state detectors, and matrix-assisted laser desorption/ionization time of flight devices (MALDI-ToF). Combinations of these may be suitable as well. The unit 214 may include a computer or signal processor configured to provide an output signal 218 corresponding to a particular resulting chemical composition measured or otherwise detected in the extracted gas. In some embodiments, the output signal 218 may then be conveyed to the peripheral devices 144 described above for consideration by interested parties (i.e., the well operator, drillers, etc.).

Following analysis in the unit 214, the extracted gas may exit the unit 214 via a gas conduit 220 and may be used or disposed of in several different ways. In some embodiments, for instance, the gas conduit 220 may flare the extracted gases or convey the gases to on-site equipment associated with the platform 102 (FIG. 1) in order to power such equipment. In other embodiments, the gas conduit 220 may convey the extracted gases to consumers for consumption or purchase. In yet other embodiments, the gas conduit 220 may convey the extracted gas back downhole to be reinjected into a wellbore.

Following extraction of the gases, the remaining fluid sample 202 may exit the fluid separator 212 via a fluid conduit 222 and may be conveyed back to the source of the sample fluid 202. In some embodiments, such as when the fluid sample 202 is drilling fluid, the fluid sample 202 may be re-introduced into the fluid return line 130 (FIG. 1) to be reconditioned with the rest of the fluid 122 (FIG. 1). As will be appreciated, the fluid sample 202 may be re-introduced into the returning fluid 122 at any other point convenient for the well operator, without departing from the scope of the disclosure.

Prior to returning to the source of the sample fluid 202, however, the remaining fluid sample 202 may pass through one or both of a liquid trap 224 and a second pump 226 arranged in the fluid circuit of the system 142. The liquid trap 224 may be, for example, an expansion vessel used to contain overflow fluids exiting the fluid separator 212. In the event there is a pressure imbalance in the fluid circuit, the liquid trap 224 may prove advantageous in containing excess fluids exiting the fluid separator 212 and otherwise preventing such excess fluid from overwhelming any downstream components of the system 142. The pump 226 may be similar to the pump 206, and may otherwise be configured to ensure that the remaining fluid sample 202 is able to be properly returned to the source of the fluid sample 202 for reconditioning.

A carrier fluid 228 may be injected into the fluid circuit of the system 142 to help carry or transport the gases extracted from the fluid sample 202 in the fluid separator 212 to the unit 214. The carrier fluid 228 may be an inert gas including, but not limited to, nitrogen, helium, neon or argon. In some embodiments, the carrier fluid 228 may be atmospheric gas. In other embodiments, the carrier fluid 228 may be any fluid that is not atmospheric gas or a gas with high oxygen content, thereby allowing for increased sensitivity and reduced contamination from helium, water, sulfur species and any other component commonly found in significant concentrations in the atmosphere.

In some embodiments, as illustrated, the carrier fluid 228 may be injected into the fluid circuit at a point prior to the fluid separator 212. Injecting the carrier fluid 228 into the fluid circuit prior to the fluid separator 212 may help facilitate the gas extraction process by increasing the gaseous surface area through the fluid separator 212. The injected carrier fluid 228 may also prove advantageous in ensuring that a two-phase flow is always introduced into the fluid separator 212. In other embodiments, the injected carrier fluid 228 may prove advantageous in ensuring that a multi-phase flow is introduced into the fluid separator 212.

In other embodiments, however, the carrier fluid 228 may be conveyed (i.e., injected or drawn into) into the fluid circuit following the fluid separator 212, such as into the fluid flow line 216 (as shown in dashed), without departing from the scope of the disclosure. Injecting the carrier fluid 228 into the fluid flow line 216 may prove advantageous in helping to more efficiently draw the extracted gas(es) out of the fluid separator 212 and carry the extracted gas to the unit 214.

The system 142 may further include one or more energy input devices, shown as a thermal energy device 230 and/or at least one sonicator 232. The energy input devices may be configured to introduce energy into the fluid sample 202. While the energy input devices are depicted in FIG. 2 as the thermal energy device 230 and the sonicator 232, it will be appreciated that other types and/or forms of energy input devices may equally be used in the system 142, without departing from the scope of the disclosure. For instance, embodiments are contemplated herein that use energy input devices configured to impart mechanical or electromagnetic energy to the fluid sample 202.

In some embodiments, as illustrated, the energy input device(s) (i.e., the thermal energy device 230 and the sonicator 232) may be arranged in the system 142 at a point in the fluid circuit prior to the fluid separator 212. In other embodiments, as shown in dashed, the energy input device(s) may be arranged on or otherwise attached directly to the fluid separator 212. As will be appreciated, combining the energy input device(s) with the fluid separator 212 may prove advantageous in reducing the overall size of the system 142 and offer a broader range of flexibility in the installation and design of the system 142.

The thermal energy device 230 may be configured to impart a known quantity of thermal energy (i.e., heat) to the fluid sample 202. In some embodiments, the thermal energy device 230 is a heater, such as a resistance coil heater or a heat exchanger, configured to increase the temperature of the fluid sample 202 to a predetermined gas extraction temperature. In other embodiments, the thermal energy device 230 may be a cooling device, such as a heat exchanger, an evaporation unit or a refrigeration unit. A cooling device may be required, for example, in applications where the fluid 122 (FIG. 1) is returned to the surface at elevated temperatures, such as greater than 100° C. When required, the cooling device may also be configured to place the fluid sample 202 at the predetermined gas extraction temperature.

The predetermined gas extraction temperature, for example, may be any temperature that does not exceed a critical temperature threshold in the fluid sample 202, past which point the fluid sample 202 may begin to break down and commence the formation of scale or dewatering of bentonite. In some fluid samples 202, for example, the critical temperature threshold may be at or about 90° C. In at least one embodiment, the thermal energy device 230 may be configured to maintain the fluid sample 202 at the predetermined gas extraction temperature using, for example, a proportional integral derivative (PID) loop controller or the like. Alternatively, or in addition to directly heating the fluid sample 202 with the thermal energy device 230, the carrier fluid 228 may also be heated using the thermal energy device 230 or another device. As a result, upon mixing with the fluid sample 202, the carrier fluid 228 may heat the fluid sample 202 to the predetermined gas extraction temperature.

The sonicator(s) 232 may be configured to introduce a known amount of sonic vibration (i.e., sound energy) into the fluid sample 202 and thereby induce cavitation. As will be appreciated, sonic vibration causes molecular vibration that can lead to the formation of bubbles in the fluid sample 202 that may subsequently collapse, thereby imparting energy into the system and resulting in cavitation of the fluid sample 202. The sonicator(s) 232 may be broad or variable frequency devices that are able to work with a wide variety of densities and compositions of the fluid sample 202. In some embodiments, the sonicator(s) 232 may be selectively tuned to a predetermined frequency or amplitude corresponding to the type of fluid sample 202 being analyzed. In other embodiments, the sonicator(s) 232 may be configured to introduce preconfigured shocks of high or low or other frequency sound energy into the fluid sample 202 in order to cause additional cavitation. In at least one embodiment, the sonicator(s) 232 may be pneumatically or hydraulically actuated. As will be appreciated, this may prove advantageous if the system 142 is used in an explosive area.

In some embodiments, one or more fluid restriction devices 234 may be arranged in one or both of the fluid flow line 216 and the fluid conduit 222. The fluid restriction devices 234 may be configured to regulate the flow of fluids exiting the fluid separator 212 and may be, but are not limited to, chokes or actuatable valves. The fluid restriction device 234 in the fluid flow line 216, for example, may prove advantageous in ensuring that an appropriate amount of gas is extracted from the fluid sample 202 in the fluid separator 212. As can be appreciated, having actuatable valves as the fluid restriction devices 234 may prove advantageous in fine tuning the pressure balance in the fluid circuit of the system 142.

Figure 3A:
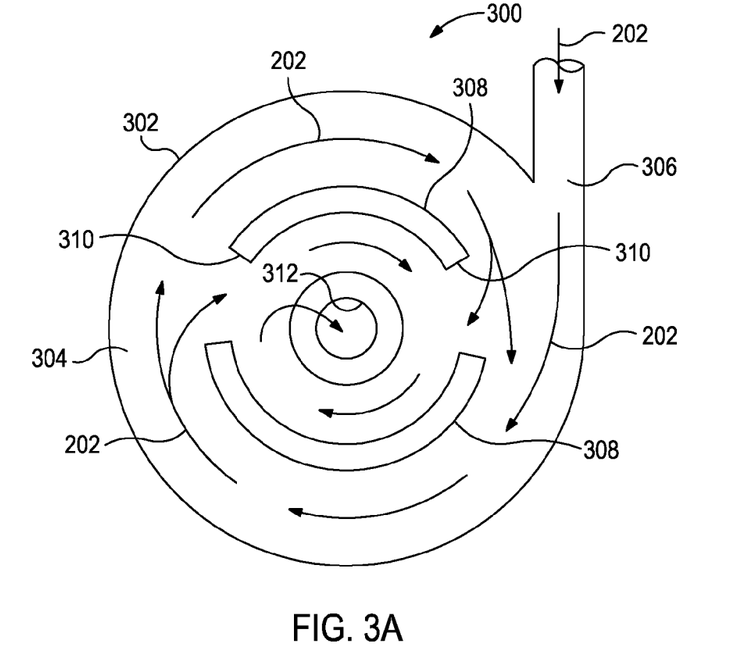
FIG. 3A illustrates a top view of an exemplary fluid separator, according to one or more embodiments of the disclosure.
Figure 3B:
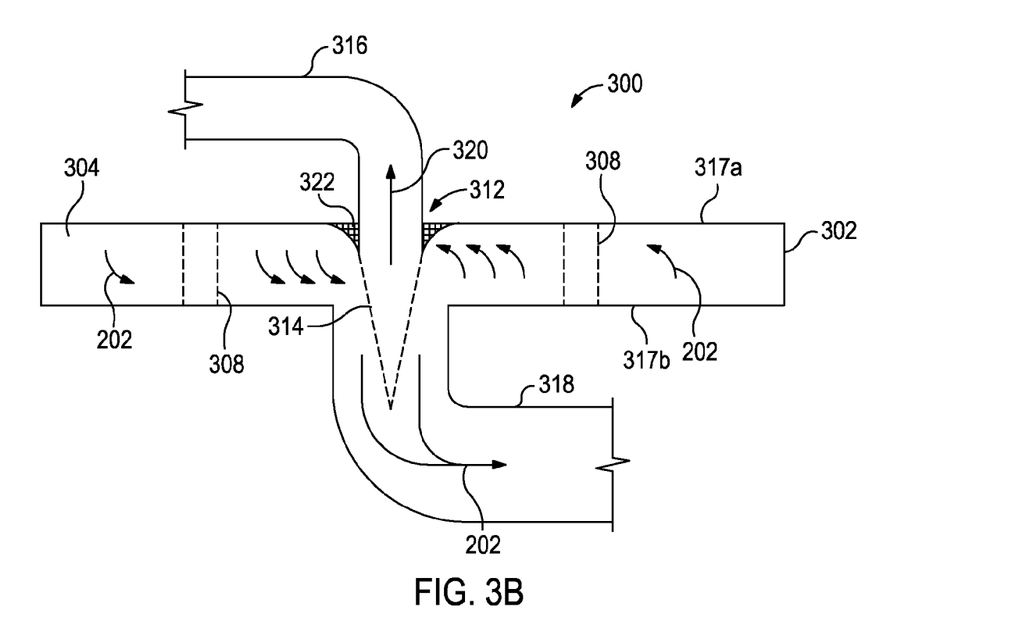
FIG. 3B illustrates a cross-sectional side view of the fluid separator of FIG. 3A.

Referring now to FIGS. 3A and 3B, with continued reference to FIG. 2, illustrated are top and cross-sectional side views of an exemplary fluid separator 300, according to one or more embodiments of the disclosure. The fluid separator 300 may replace the fluid separator 212 of FIG. 2 described above or may otherwise be the same device. As illustrated, the fluid separator 300 may include a body 302 that defines a flow chamber 304 configured to receive the fluid sample 202. One or more inlets 306 (one shown) may be defined or otherwise provided in the body 302 for receiving the fluid sample 202 from the fluid circuit of the system 142 (FIG. 2) and conveying the incoming fluid sample 202 into the flow chamber 304. While only one inlet 306 is depicted in FIG. 3A, it will be appreciated that more than one inlet 306 may be employed, without departing from the scope of the disclosure.

The fluid sample 202 enters the flow chamber 304 via the inlet 306 in a generally tangential direction with respect to the body 302. As depicted, the body 302 may be circular or disc-like in shape, and the inlet 306 may be tangentially aligned to the circumference of the body 302. As a result, upon being introduced into the flow chamber 304, the fluid sample 202 will commence to spiral or spin about the flow chamber 304, as indicated by the various arrows. The fluid sample 202 flows circuitously through the flow chamber 304, eventually spiraling inward to an outlet 312 centrally defined in the body 302 where it may eventually be discharged as liquid and gaseous components.

As used herein, the term "spin" refers to the rotational flow of a fluid (e.g., the fluid sample 202) within the flow chamber 304. During rotational flow within the flow chamber 304, fluid components of the fluid sample 202 having a higher density or higher viscosity will be forced farther towards the outside (i.e., the circumference or the perimeter) of the flow chamber 304 compared to fluid components having a lower density or lower viscosity. This is due in part, to the increased effect that centripetal and reactive centrifugal forces have on the greater mass or viscosity of the higher density/viscosity fluid components. Accordingly, phase(s) of the fluid sample 202 having a higher density or higher viscosity rotationally flow closer to the outside of the flow chamber 304 and the phase(s) of the fluid sample 202 having a lower density or lower viscosity rotationally flow closer to the center of the flow chamber 304. As a result, the higher density fluid components will flow farther towards the outside of the flow chamber 304, and the lower density fluid components will flow closer towards the center of the flow chamber 304.

One or more structures 308 may be arranged within or otherwise defined by the flow chamber 304. The structures 308 may be configured to help the fluid sample 202 flow circularly and otherwise spiral about the outlet 312 until exiting the fluid separator 300. In some embodiments, the structures 308 may be characterized as a single structure having one or more breaks or openings 310 defined therein, or as multiple structures separated by the breaks or openings 310. In other embodiments, the structures 308 may be in the form of one or more circumferentially extending vanes having one or more of the openings 310 defined between the vane(s). Alternatively, or in addition thereto, the structures 308 could be in the form of one or more circumferentially extending recesses in one or more walls of the flow chamber 304. For instance, the structures 308 could project inwardly and/or outwardly relative to one or more walls of the flow chamber 304. Moreover, the structures 308 may be equally or unequally spaced apart, depending on the desired operational parameters of the fluid separator 300.

In exemplary operation, the fluid sample 202 enters the flow chamber 304 tangentially via the inlet(s) 306 and begins to spin or spiral. The velocity or angular momentum of the fluid sample 202 gradually increases as it nears the outlet 312, thereby resulting in higher g-forces acting on the fluid sample 202. The increased g-forces assumed by the fluid sample 202 cause the less-dense gaseous components entrained within the fluid sample 202 to separate from the more-dense liquid/solid components. As best seen in FIG. 3B, the g-forces acting on the fluid sample 202 may result in the formation of a vortex 314 at the outlet 312.

As depicted in FIG. 3B, the outlet 312 may include or otherwise provide a gas outlet 316 extending out of the top 317a of the fluid separator 300 and a liquid outlet 318 extending out of the bottom 317b of the fluid separator 300. Within the vortex 314, the fluid components of the fluid sample 202 that are more dense (e.g., liquids and solids) orbit around the fluid components that are less dense (e.g., gases). As a result, gases 320 may be able to migrate or flow toward the center of the flow chamber 304, and thereby become separated from the remaining liquid and solid components of the fluid sample 202. Alternatively, the vortex 314 could separate the more dense liquid components of a production fluid sample (e.g., water) from the less dense liquid component of the production fluid sample (e.g., oil).

Figure 5:
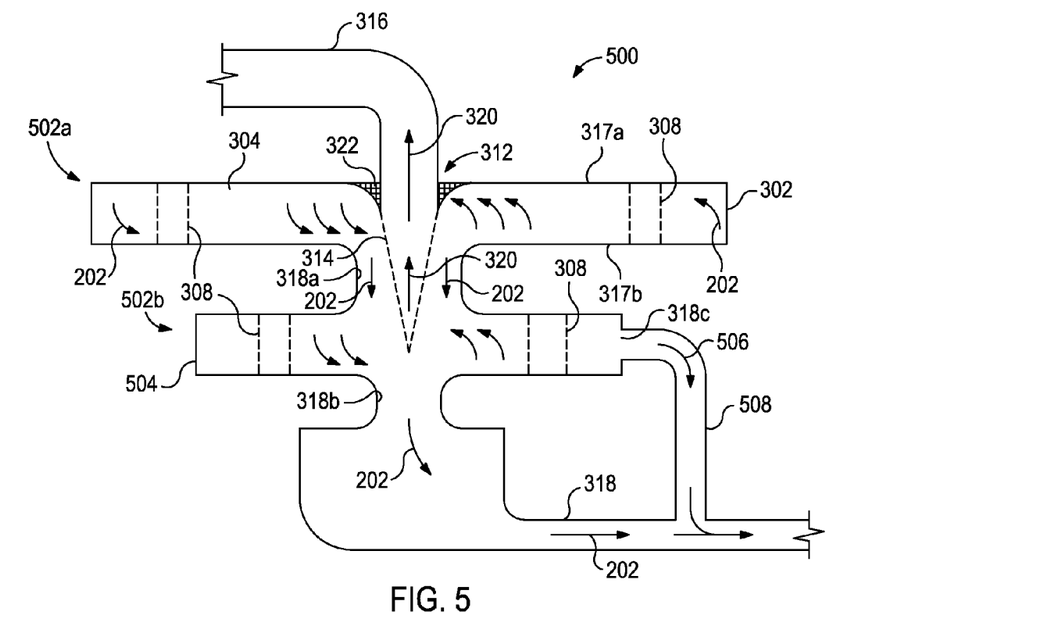
FIG. 5 illustrates a cross-sectional side view of another exemplary fluid separator, according to one or more embodiments.

As illustrated, the vortex 314 may extend partially into the liquid outlet 318 since the kinetics and/or dynamics of separating the gases 320 out of the fluid sample 202 via the vortex 314 may require additional surface area and time. In at least one embodiment, the periphery or edge of the liquid outlet 318 at the bottom 317b of the fluid separator 300 may be curved, angled, or chamfered (as shown in FIG. 5) in order to promote the vortex 314 extending into the liquid outlet. At the outlet 312, the angular momentum of the spiraling fluid sample 202 is converted into linear momentum. This angular momentum creates a large centripetal force that acts radially upon the fluids. As a result, the gases 320 may be conveyed into or otherwise entrained within the gas outlet 316, while the remaining liquid and solid components of the fluid sample 202 may enter the liquid outlet 318.

The gas outlet 316 may be fluidly coupled to the fluid flow line 216 (FIG. 2), and the liquid outlet 318 may be fluidly coupled to the fluid conduit 222 (FIG. 2). Accordingly, the gases 320 may subsequently be conveyed to the unit 214 (FIG. 2) for analysis, while the remaining liquid and solid components of the fluid sample 202 may be conveyed back to the source of the fluid sample 202, such as being reintroduced into the fluid return line 130 (FIG. 1) to be reconditioned with the rest of the fluid 122.

In some embodiments, the fluid separator 300 may further include an annular flow diverter 322 arranged or otherwise defined on the inner surface of the top 317a of the body 302. The flow diverter 322 may form or otherwise define a 360° concentric ring about or within the outlet 312. The annular flow diverter 322 may be angled or curved to channel or divert the spinning fluid sample 202 into the vortex 314 and thereby prevent the fluid sample 202 from entering the gas outlet 320 prior to separation. To accomplish this, the flow diverter 322 may extend axially a short distance (i.e., height) between the gas outlet 316 and the liquid outlet 318. The annular flow diverter 322 may also be configured to at least partially maintain the gases 320 separated from the fluid sample 202 as the gases 320 are entrained or otherwise drawn into the gas outlet 316.

Notably, both the gases 320 (i.e., low density and/or viscosity fluids) and the remaining liquid and solid components of the fluid sample 202 (i.e., the high density and/or viscosity fluids) exit at the center of the fluid separator 300. Such a configuration is different from conventional fluid separators, which typically extract the low and high density fluids at different points or locations within the fluid separator. Moreover, unlike most fluid separators, which are long cylindrical assemblies, the currently disclosed fluid separator 300 employs a more compact "pancake" design that can be much smaller than conventional fluid separators. This compact design can be particularly advantageous in offshore environments or applications where space is often limited.

Furthermore, whereas conventional fluid separators often require paddles or impellers to help induce fluid movement and separation, the flow of the fluid sample 202 itself provides the required fluid energy to start the separation process. More particularly, the circular shape and lower profile of the fluid separator 300 induces higher fluid velocities in the fluid sample 202, which advantageously enhances liquid/gas separation. As will be appreciated, generating higher fluid velocities magnifies the centripetal forces of the spinning fluid, which also translates into shorter dwell times within the fluid separator 300. Accordingly, the fluid separator 300 may be able to process the fluid sample 202 more quickly than conventional fluid separators.

Figure 4:
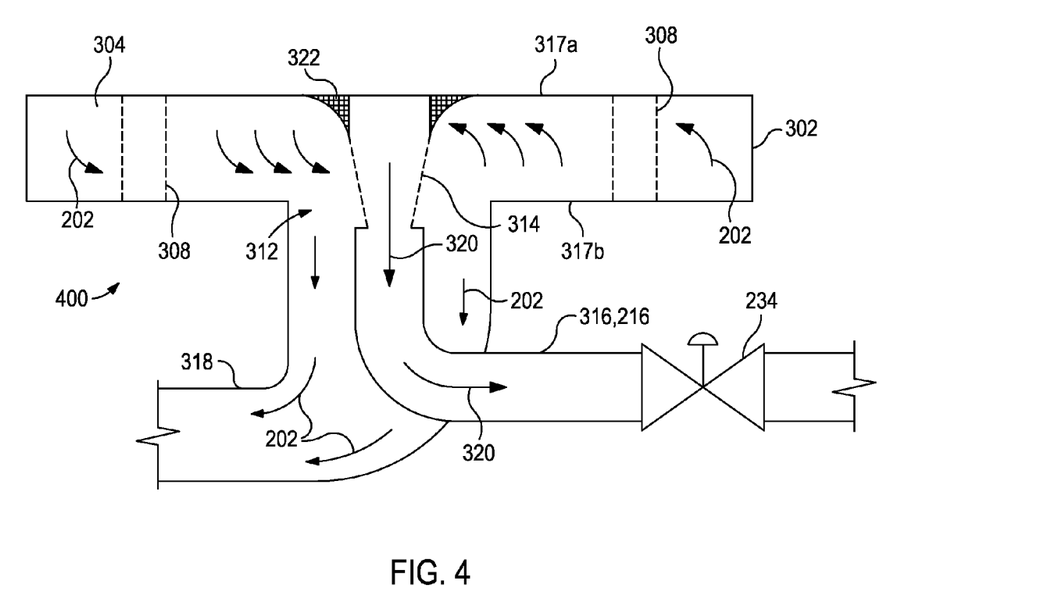
FIG. 4 illustrates a cross-sectional side view of another exemplary fluid separator, according to one or more embodiments.

Referring now to FIG. 4, with continued reference to FIGS. 3A and 3B, illustrated is a cross-sectional side view of another exemplary fluid separator 400, according to one or more embodiments. The fluid separator 400 may be similar in some respects to the fluid separator 300 of FIGS. 3A and 3B and therefore may be best understood with reference thereto, where like numerals correspond to like elements not described again in detail. Moreover, similar to the fluid separator 300 of FIGS. 3A-3B, the fluid separator 400 may replace the fluid separator 212 of FIG. 2 described above or may otherwise be the same device.

As illustrated, the fluid separator 400 may include the body 302 that defines the flow chamber 304 for receiving the fluid sample 202 from the fluid circuit of the system 142 (FIG. 2). Again, the fluid sample 202 may enter the flow chamber 304 of the fluid separator 400 via the inlet 306 (not shown) in a generally tangential direction with respect to the body 302 whereby the fluid sample 202 is forced to spin about the flow chamber 304, eventually spiraling inward toward the outlet 312. The one or more structures 308 may also be arranged within or otherwise defined by the flow chamber 304 and configured to help the fluid sample 202 flow circularly and otherwise spiral about the outlet 312.

Similar to the fluid separator 300, the fluid separator 400 may include a gas outlet 316 and a liquid outlet 318. Unlike the fluid separator 300, however, the gas outlet 316 in the fluid separator 400 may provide a tube that is concentrically arranged within the liquid outlet 318. As a result, the gases 320 (i.e., low density fluids) and the remaining liquid and solid components of the fluid sample 202 (i.e., the high density fluids) exit the fluid separator 400 through the bottom 317b of the fluid separator 400 and otherwise in the same linear direction. Alternatively, while not shown, a second gas outlet may also be defined in the top 317a of the body 302, similar to the gas outlet 316 of the fluid separator 300. In such embodiments, gases 320 may be extracted through both the top 317a and the bottom 317b of the body 302, without departing from the scope of the disclosure.

In exemplary operation, the fluid sample 202 enters the flow chamber 304 tangentially and begins to spin. The velocity of the fluid sample 202 increases as it nears the outlet 312, thereby resulting in higher g-forces acting on the fluid sample 202 that cause the less-dense gases 320 entrained in the fluid sample 202 to separate from the more-dense liquid/solid components. The vortex 314 may again form about the outlet 312 in response to the g-forces acting on the fluid sample 202. The vortex 314 allows the gases 320 to migrate or flow toward the center of the flow chamber 304, and thereby become separated from the remaining liquid and solid components of the fluid sample 202. At the outlet 312, the angular momentum of the spiraling fluid sample 202 is converted into linear momentum, thereby allowing the separated gases 320 to be conveyed into or otherwise entrained within the gas outlet 316, while the remaining liquid and solid components of the fluid sample 202 enter the liquid outlet 318 about the gas outlet 316.

The annular flow diverter 322 may also be included in the fluid separator 400 to channel the spinning fluid sample 202 into the vortex 314. The annulus flow diverter 322 may also help to maintain the gases 320 separated from the remaining portions of the fluid sample 202 as the gases 320 are entrained into the gas outlet 316 therebelow.

The gas outlet 316 may be fluidly coupled to the fluid flow line 216, as indicated above. Moreover, as discussed above, in some embodiments a fluid restriction device 234 may be arranged in the fluid flow line 216 to regulate the flow of the gases 320 exiting the fluid separator 400. In at least one embodiment, the fluid restricting device 234 of the fluid separator 400 may be an actuatable valve that may be adjusted so that the gas flow 320 is proportional to the amount of gas entrained in the entering fluid sample 202.

It will be appreciated that the foregoing advantages and points of novelty of the fluid separator 300, as noted herein above, are equally applicable to the fluid separator 400. For instance, as opposed to the design of conventional fluid separators, both the gases 320 (i.e., low density fluids) and the remaining liquid and solid components of the fluid sample 202 (i.e., the high density fluids) exit at the center of the fluid separator 400. Moreover, the compact design and circular shape of the fluid separator 400 induce higher fluid velocities in the fluid sample 202, which advantageously enhances liquid/gas separation. Accordingly, the fluid separator 400 may be able to process the fluid sample 202 more quickly than conventional fluid separators.

Referring now to FIG. 5, with continued reference to FIGS. 3A-3B and 4, illustrated is a cross-sectional side view of another exemplary fluid separator 500, according to one or more embodiments. The fluid separator 500 may be similar in some respects to the fluid separators 300 and 400 of FIGS. 3A-3B and 4 and therefore may be best understood with reference thereto, where like numerals will again correspond to like elements not described again. Moreover, similar to the fluid separators 300 and 400 of FIGS. 3A-3B and 4, the fluid separator 500 may replace the fluid separator 212 of FIG. 2 described above or may otherwise be the same device.

As illustrated, the fluid separator 500 may include a first separation stage 502a and a second separation stage 502b. The first and second separation stages 502a,b may be fluidly coupled via a first liquid outlet 318a defined by the first separation stage 502a. The first separation stage 502a may be similar to the fluid separator 300 of FIGS. 3A-3B and therefore include the body 302 that defines the flow chamber 304 for receiving the fluid sample 202. Again, the fluid sample 202 may enter the flow chamber 304 of the fluid separator 500 via the inlet 306 (not shown) in a generally tangential direction with respect to the body 302 whereby the fluid sample 202 is forced to spin within the flow chamber 304, eventually spiraling inward toward the outlet 312. The one or more structures 308 may also be arranged within or otherwise defined by the flow chamber 304 and configured to help the fluid sample 202 to flow circularly and otherwise spiral about the outlet 312.

At the outlet 312, the vortex 314 is again formed and the increased angular momentum of the fluid sample 202 allows the less-dense gases 320 entrained therein to separate from the more-dense liquid/solid components. Any gases 320 that migrate or flow toward the center of the flow chamber 304 are then able to be separated and conveyed into or otherwise entrained within the gas outlet 316 defined through the top 317a of the body 302.

The remaining liquid and solid components of the fluid sample 202 may then exit the first separation stage 502a via the first liquid outlet 318a defined in the bottom 317b of the body 302. The fluid sample 202 may then enter the second separation stage 502b, which may be similar in some respects to the first separation stage 502a. For instance, the second separation stage 502b may also include a body 504 that is circular or disc-shaped such that any incoming fluid sample 202 from the first separation stage 502a may also be induced to spin or spiral about the center of the fluid separator 500. As a result, the vortex 314 formed within the fluid separator 500 may extend downward and into the second separation stage 502*b*.

One or more structures 308 may also be arranged within the second expansion stage 502*b* and further help the fluid sample 202 rotate for gas separation purposes. In the vortex 314 that extends into the second expansion stage 502*b*, the less-dense gases 320 entrained in the fluid sample 202 are again able to separate from the more-dense liquid/solid components and migrate toward the center to be conveyed into or otherwise entrained within the gas outlet 316. Any remaining liquid and solid components of the fluid sample 202 from the second separation stage 502*b* may exit the body 504 via a second liquid outlet 318*b* defined in the bottom of the body 504. The second liquid outlet 318*b* may be fluidly coupled to the fluid conduit 222 (FIG. 2) and configured to reintroduce the remaining fluid sample 202 to the source of the fluid sample 202, such as into the fluid return line 130 (FIG. 1) to be reconditioned with the rest of the fluid 122.

Notably, in the second expansion stage 502*b*, some of the fluid sample 202 may expand within the body 504, thereby allowing for lower velocity or angular momentum of the fluid sample 202 without losing its rotational energy derived from spiraling within the first separation stage 502*a*. With a lower velocity, some of the liquid 506 in the fluid sample 202 may be able to be separated and/or extracted from the fluid sample 202 and exit the body 504 via a third liquid outlet 318*c* defined or otherwise provided in a side wall of the body 504. As illustrated, the third liquid outlet 318*c* may be fluidly coupled to a liquid conduit 508 that feeds the liquid 506 into the fluid conduit 222 (FIG. 2) and is otherwise rejoined with the remaining fluid sample 202 exiting the second separation stage 502*b* via the second liquid outlet 318*b*.

While two separation stages 502*a,b* are depicted in FIG. 5, it will be appreciated that more than two separation stages may be employed, without departing from the scope of the disclosure. Moreover, any of the variations described with respect to the fluid separators 300 and 400 of FIGS. 3A-3B and 4, respectively, may equally be applied to the fluid separator 500, in keeping with the principles of this disclosure. Furthermore, it will again be appreciated that the foregoing advantages and points of novelty of the fluid separator 300 over conventional fluid separators, as noted herein above, are equally applicable to the fluid separator 500, and therefore will not be described again.

Embodiments disclosed herein include:

A. A fluid extraction system that includes a fluid circuit fluidly coupled to a source of a fluid to receive a fluid sample from the source, and a fluid separator arranged in the fluid circuit and including a body that defines at least one fluid inlet, a flow chamber defined within the body to receive the fluid sample from the at least one fluid inlet, wherein the fluid sample flows and forms a vortex within the flow chamber and gases entrained within the fluid sample separate and migrate toward a center of the vortex, and an outlet defined in the flow chamber and providing a gas outlet that entrains and removes the gases and a liquid outlet that receives and removes a remaining portion of the fluid sample.

B. A method that includes obtaining a fluid sample from a source of a fluid, conveying the fluid sample to a fluid circuit of a fluid extraction system, the fluid extraction system including a fluid separator arranged in the fluid circuit and having a body that defines at least one fluid inlet, a flow chamber, and an outlet, wherein the outlet provides a gas outlet and a liquid outlet, receiving the fluid sample into the flow chamber tangentially with respect to the body via the at least one inlet, urging the fluid sample to spin within the flow chamber such that the fluid sample flows and forms a vortex at the outlet, separating gases from the fluid sample within the vortex and entraining the gases into the gas outlet, and receiving a remaining portion of the fluid sample in the liquid outlet.

Each of embodiments A and B may have one or more of the following additional elements in any combination: Element 1: further comprising at least one of a unit arranged in the fluid circuit to receive and analyze the gases from the gas outlet, and a carrier fluid injected into the fluid circuit to help convey the sample fluid to the unit. Element 2: further comprising one or more energy input devices arranged in the fluid circuit to introduce energy into the fluid sample to aid in extracting the gases from the fluid sample. Element 3: wherein the one or more energy input devices includes a thermal energy device that provides thermal energy to the fluid sample. Element 4: wherein the one or more energy input devices includes at least one sonicator that provides sonic vibration to the fluid sample to induce cavitation. Element 5: wherein the one or more energy input devices is arranged at a point in the fluid circuit prior to the fluid separator. Element 6: wherein at least one of the one or more energy input devices is arranged on the fluid separator. Element 7: wherein the fluid sample enters the flow chamber tangentially with respect to the body via the at least one inlet. Element 8: further comprising one or more structures arranged within the flow chamber that urge the fluid sample to spin within the flow chamber and spiral about the outlet. Element 9: wherein the body has a top and a bottom, and the gas outlet is defined in the top and the liquid outlet is defined in the bottom. Element 10: wherein the body has a top and a bottom, and the fluid separator further comprises an annular flow diverter arranged on an inner surface of the top. Element 11: wherein the body has a top and a bottom, and the liquid outlet is defined in the bottom and the gas outlet comprises a tube concentrically disposed within the liquid outlet. Element 12: further comprising a unit arranged in the fluid circuit to receive and analyze the gases from the gas outlet, wherein the gas outlet is fluidly coupled to a fluid flow line extending to the unit, and a fluid restriction device arranged in the fluid flow line to regulate a flow of the gases exiting the fluid separator. Element 13: wherein the fluid separator further comprises a first separation stage, wherein the body, the flow chamber, and the fluid outlet are a first body, a first flow chamber, and a first fluid outlet, respectively, and each being associated with the first separation stage, wherein the first body includes a top that defines the gas outlet and a bottom that defines the first fluid outlet, a second separation stage having a second body and a second flow chamber fluidly coupled to the first flow chamber via the first liquid outlet to receive the remaining portion of the fluid sample, wherein the vortex extends into the second separation stage and additional gases entrained within the remaining portion of the fluid sample separate and migrate toward the center of the vortex to be conveyed into the gas outlet, and a second liquid outlet defined in a bottom of the second body, wherein the remaining portion of the fluid sample exits the second separation stage via the second liquid outlet. Element 14: further comprising a third liquid outlet defined in a side wall of the second body, wherein the remaining portion of the fluid sample expands in the second separation stage and liquid is separated therefrom within the second separation stage and exits the second body via the third liquid outlet. Element 15: wherein the sample fluid is a fluid selected from the group consisting of a drilling fluid, a completion fluid, a fracking fluid, a wellbore treatment fluid, a production fluid, a reservoir fluid, a gas, oil, water, and any combination thereof.

Element 16: further comprising injecting a carrier fluid into the fluid circuit, conveying the gases to a unit arranged in the fluid circuit with the carrier fluid, and receiving and analyzing the gases from the gas outlet with the unit. Element 17: further comprising introducing energy into the fluid sample using one or more energy input devices arranged in the fluid circuit. Element 18: wherein the one or more energy input devices includes a thermal energy device, the method further comprising imparting thermal energy to the fluid sample with the thermal energy device. Element 19: further comprising maintaining a temperature of the fluid sample at a predetermined gas extraction temperature with the thermal energy device. Element 20: wherein the one or more energy input devices includes at least one sonicator, the method further comprising introducing sonic vibration into the fluid sample with the at least one sonicator, and inducing cavitation of the fluid sample with the sonic vibration. Element 21: wherein the body has a top and a bottom, the method further comprising diverting the fluid sample into the vortex with an annular flow diverter arranged on an inner surface of the top. Element 22: wherein the body has a top and a bottom, and the gas outlet is defined in the top and the liquid outlet is defined in the bottom, the method further comprising extracting the gases from the fluid separator through the top of the body, and extracting the remaining portion of the fluid sample through the bottom of the body. Element 23: wherein the body has a top and a bottom and the liquid outlet is defined in the bottom, and wherein entraining the gases into the gas outlet comprises entraining the gases into a tube concentrically disposed within the liquid outlet such that the gases and the remaining portion of the fluid sample exit the fluid separator in a same linear direction. Element 24: wherein the gas outlet is fluidly coupled to a fluid flow line extending to a unit arranged in the fluid circuit, the method further comprising regulating a flow of the gases exiting the fluid separator with a fluid restriction device arranged in the fluid flow line. Element 25: wherein the body, the flow chamber, and the fluid outlet are a first body, a first flow chamber, and a first fluid outlet, respectively, each being associated with a first separation stage of the fluid extraction system, and wherein the first body includes a top that defines the gas outlet and a bottom that defines the first fluid outlet, the method further comprising receiving the remaining portion of the fluid sample in a second separation stage of the fluid extraction system, the second separation stage having a second body and a second flow chamber fluidly coupled to the first flow chamber via the first liquid outlet, wherein the vortex extends into the second separation stage via the first liquid outlet, allowing additional gases entrained within the remaining portion of the fluid sample to separate and migrate toward a center of the second flow chamber, entraining the additional gases into the gas outlet, and extracting the remaining portion of the fluid sample out of the second separation stage via a second liquid outlet defined in a bottom of the second body. Element 26: further comprising expanding the remaining portion of the fluid sample in the second separation stage, separating liquid from the remaining portion of the fluid sample within the second separation stage, and extracting the liquid from the second body via a third liquid outlet defined in a side wall of the second body.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:
1. A fluid extraction system, comprising:
    a fluid circuit fluidly coupled to a source of a fluid to receive a fluid sample from the source; and
    a fluid separator arranged in the fluid circuit and including:
        a body that provides a top, a bottom, a fluid inlet, and an annular flow diverter arranged on an inner surface of the top;
        a flow chamber comprising walls defined within the body and extending about a center of the flow chamber to receive the fluid sample from the fluid inlet, wherein the walls are arranged to direct the fluid sample to form a vortex about the center of the flow chamber and to direct gases entrained within the fluid sample to separate and migrate toward the center of the flow chamber; and
        an outlet defined in the body at the center of the flow chamber and comprising a gas outlet that entrains and removes the gases and a liquid outlet that receives and removes a remaining portion of the fluid sample.

2. The fluid extraction system of claim 1, further comprising a unit arranged in the fluid circuit to receive and analyze the gases from the gas outlet.

3. The fluid extraction system of claim 1, further comprising one or more energy input devices arranged in the fluid circuit.

4. The fluid extraction system of claim 3, wherein the one or more energy input devices includes a thermal energy device that provides thermal energy to the fluid sample.

5. The fluid extraction system of claim 3, wherein the one or more energy input devices includes at least one sonicator.

6. The fluid extraction system of claim 3, wherein the one or more energy input devices is arranged at a point in the fluid circuit prior to the fluid separator.

7. The fluid extraction system of claim 3, wherein at least one of the one or more energy input devices is coupled to the fluid separator.

8. The fluid extraction system of claim 1, wherein the fluid sample enters the flow chamber tangentially with respect to the body via the fluid inlet.

9. The fluid extraction system of claim 1, further comprising one or more structures arranged within the flow chamber that urge the fluid sample to spin within the flow chamber and spiral about the outlet.

10. The fluid extraction system of claim 1, wherein the gas outlet is defined in the top and the liquid outlet is defined in the bottom.

11. The fluid extraction system of claim 1, wherein the liquid outlet is defined in the bottom and the gas outlet comprises a tube concentrically disposed within the liquid outlet.

12. The fluid extraction system of claim 1, wherein the fluid separator further comprises:
a first separation stage, wherein the body, the flow chamber, and the fluid outlet are a first body, a first flow chamber, and a first fluid outlet, respectively, and each being associated with the first separation stage, wherein the first body includes a top that defines the gas outlet and a bottom that defines the first fluid outlet;
a second separation stage having a second body and a second flow chamber fluidly coupled to the first flow chamber via the first liquid outlet to receive the remaining portion of the fluid sample, wherein the vortex extends into the second separation stage and additional gases entrained within the remaining portion of the fluid sample separate and migrate toward the center of the flow chamber to be conveyed into the gas outlet; and
a second liquid outlet defined in a bottom of the second body a center of the second flow chamber, wherein the remaining portion of the fluid sample exits the second separation stage via the second liquid outlet.

13. The fluid extraction system of claim 12, further comprising a third liquid outlet defined in a side wall of the second body, wherein the remaining portion of the fluid sample expands in the second separation stage and liquid is separated therefrom within the second separation stage and exits the second body via the third liquid outlet.

14. The fluid extraction system of claim 1, wherein the sample fluid is a fluid selected from the group consisting of a drilling fluid, a completion fluid, a fracking fluid, a wellbore treatment fluid, a production fluid, a reservoir fluid, a gas, oil, water, and any combination thereof.

15. A method, comprising: obtaining a fluid sample from a source of a fluid;
conveying the fluid sample to a fluid circuit of a fluid extraction system, the fluid extraction system including a fluid separator arranged in the fluid circuit and having a body that provides a top, a bottom, a fluid inlet, a flow chamber, and an outlet defined in the body at a center of the flow chamber, wherein the outlet comprises a gas outlet and a liquid outlet, wherein the flow chamber comprising walls defined within the body and extending about a center of the flow chamber to receive the fluid sample from the fluid inlet, wherein the walls are arranged to direct the fluid sample to form a vortex about the center of the flow chamber and to direct gases entrained within the fluid sample to separate and migrate toward the center of the flow chamber;
receiving the fluid sample into the flow chamber tangentially with respect to the body via the fluid inlet;
urging the fluid sample to spin about the center of the flow chamber such that the fluid sample flows and forms a vortex at the outlet;
diverting the fluid sample into the vortex with an annular flow diverter arranged on an inner surface of the top;
separating gases from the fluid sample within the vortex and entraining the gases into the gas outlet from the center of the flow chamber;
and receiving a remaining portion of the fluid sample in the liquid outlet.

16. The method of claim 15, further comprising:
injecting a carrier fluid into the fluid circuit;
conveying the gases to a unit arranged in the fluid circuit with the carrier fluid; and
receiving and analyzing the gases from the gas outlet with the unit.

17. The method of claim 15, further comprising introducing energy into the fluid sample using one or more energy input devices arranged in the fluid circuit.

18. The method of claim 17, wherein the one or more energy input devices includes a thermal energy device, the method further comprising imparting thermal energy to the fluid sample with the thermal energy device.

19. The method of claim 18, further comprising maintaining a temperature of the fluid sample at a predetermined gas extraction temperature with the thermal energy device.

20. The method of claim 17, wherein the one or more energy input devices includes at least one sonicator, the method further comprising:
introducing sonic vibration into the fluid sample with the at least one sonicator; and
inducing cavitation of the fluid sample with the sonic vibration.

21. The method of claim 15, wherein the gas outlet is defined in the top and the liquid outlet is defined in the bottom, the method further comprising:
extracting the gases from the fluid separator through the top of the body; and
extracting the remaining portion of the fluid sample through the bottom of the body.

22. The method of claim 15, wherein the liquid outlet is defined in the bottom, and wherein entraining the gases into the gas outlet comprises entraining the gases into a tube concentrically disposed within the liquid outlet such that the gases and the remaining portion of the fluid sample exit the fluid separator in a same linear direction.

23. The method of claim 15, wherein the gas outlet is fluidly coupled to a fluid flow line extending to a unit arranged in the fluid circuit, the method further comprising regulating a flow of the gases exiting the fluid separator with a fluid restriction device arranged in the fluid flow line.

24. The method of claim 15, wherein the body, the flow chamber, and the fluid outlet are a first body, a first flow chamber, and a first fluid outlet, respectively, each being associated with a first separation stage of the fluid extraction system, and wherein the first body includes a top that defines the gas outlet and a bottom that defines the first fluid outlet, the method further comprising:

- receiving the remaining portion of the fluid sample in a second separation stage of the fluid extraction system, the second separation stage having a second body and a second flow chamber fluidly coupled to the first flow chamber via the first liquid outlet, wherein the vortex extends into the second separation stage via the first liquid outlet;
- allowing additional gases entrained within the remaining portion of the fluid sample to separate and migrate toward a center of the second flow chamber;
- entraining the additional gases into the gas outlet; and
- extracting the remaining portion of the fluid sample out of the second separation stage via a second liquid outlet defined in a bottom of the second body.

25. The method of claim 24, further comprising:
- expanding the remaining portion of the fluid sample in the second separation stage;
- separating liquid from the remaining portion of the fluid sample within the second separation stage; and
- extracting the liquid from the second body via a third liquid outlet defined in a side wall of the second body.

* * * * *